No. 840,593. PATENTED JAN. 8, 1907.
W. F. STEARNS.
VULCANIZED JOINT FOR VEHICLE TIRES.
APPLICATION FILED NOV. 10, 1905.
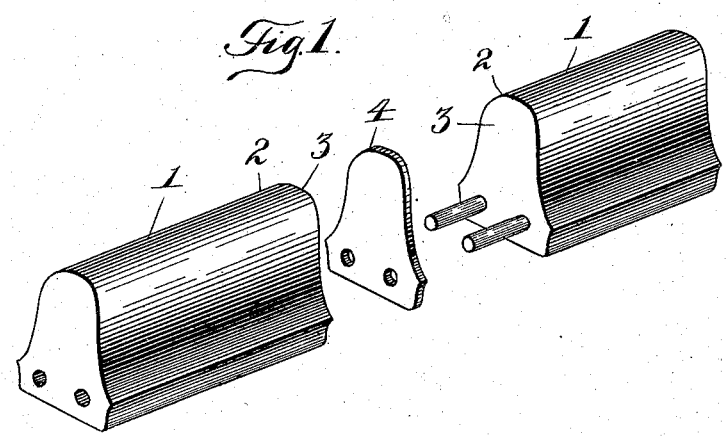
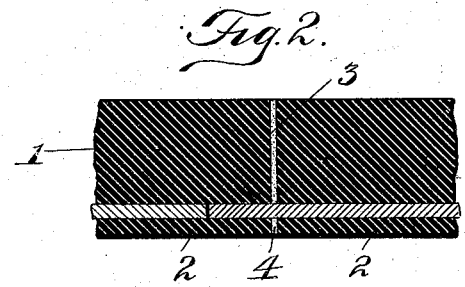
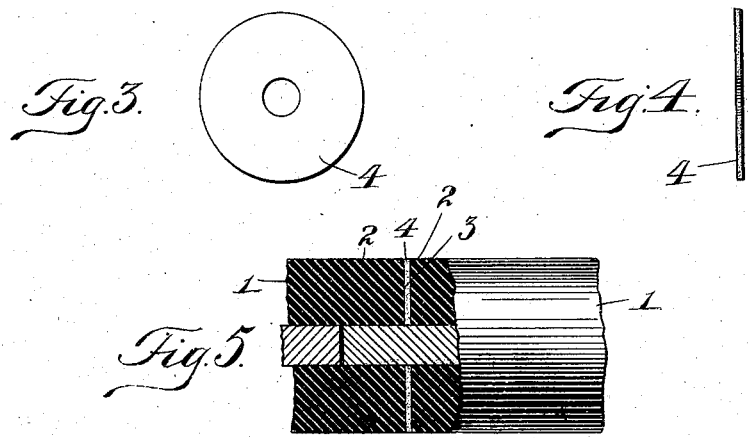
Witnesses
N. Herskovitz
Grace L. Heasley
Inventor
William F. Stearns
By his Attorneys Beach & Chapman

UNITED STATES PATENT OFFICE.

WILLIAM F. STEARNS, OF BATAVIA, NEW YORK.

VULCANIZED JOINT FOR VEHICLE-TIRES.

No. 840,593.  Specification of Letters Patent.  Patented Jan. 8, 1907.

Application filed November 10, 1905. Serial No. 286,690.

*To all whom it may concern:*

Be it known that I, WILLIAM F. STEARNS, a citizen of the United States, and a resident of Batavia, in the county of Genesee and State of New York, have invented a new and useful Vulcanized Joint, of which the following is a specification.

The object of my invention is to unite the ends of rubber articles (such as rubber tires, for example) in an improved manner, whereby a stronger joint than heretofore is formed; and my invention consists in the new joint hereinafter set forth.

Heretofore the ends of various rubber articles—such as rubber tires, for example—have been united by means of a suitable cement applied to flat abutting walls or by vulcanizing together abutting walls that were coupled together by a thin insert at an angle to such walls, the insert coupling being vulcanized in each abutting section, but leaving the rest of the abutting transverse surfaces without any coupling of any kind other than that found in the vulcanized joint itself. Frequently such cement has been made of rubber dissolved in bisulfid of carbon or gasolene. The cemented joints are apt to give way under strain, and it is very desirable, especially in rubber tires, to join the ends of the tires by a strong and durable joint.

Figure 1 is a perspective view showing two portions of an inside wire tire with my new transverse vulcanizable insert between their opposed ends. Fig. 2 is a lengthwise sectional view of two ends of a tire vulcanized on the intermediate insert. Figs. 3 and 4 are respectively a face and diametric sectional view of another form of my new vulcanizable insert. Fig. 5 is a view, partly in side elevation and partly in section, showing the ends of a round solid rubber tire vulcanized to another form of my insert.

Referring to the drawings forming a part hereof, 1 indicates one well-known form of rubber tire, whereof 2 2 indicate the end portions. 3 3 indicate the end walls, and 4 is the novel member of my new joint. It is a thin piece of vulcanizable material, and I designate it as a "vulcanizable insert." Preferably it is of a shape and size corresponding to the end walls 3 3. I usually make it from one sixty-fourth to one thirty-second of an inch in thickness. For the reason that rubber articles whose ends are to be jointed together by vulcanization are commonly vulcanized to the desired degree before their ends are united I prefer to make the vulcanizable insert out of some of the well-known quick-vulcanizing compositions, so that when the insert is in place, as shown in the drawings, and heat is applied at the joint section the end portions 2 2 will not be practically further vulcanized, the insert quickly yielding to the action of heat and becoming vulcanized in place when the end walls 3 3 are in contact (preferably pressing contact) with the side walls of the vulcanizable insert.

The advantage of my new joint is that the insert becomes practically integral with the walls 3 3, and to better accomplish this it is desirable in most cases to buff or otherwise slightly roughen the ends 3 3 to effect better adhesion between the two side walls of the vulcanizable insert and the end walls 3 3.

The operation for forming the joint is more satisfactorily performed if before the buffed ends 3 3 are brought against the sides of the insert a quick-curing vulcanizable cement is applied to the ends 3 3 of the sides of the insert.

I find in practice that my new joint is very strong and durable, and tests indicate that they are far stronger than the old cemented joints referred to.

My invention is applicable to a great variety of rubber or other vulcanizable articles whose ends or opposed portions it is desired to join together.

What I claim is—

The combination of the opposed ends of a rubber tire with an intermediate thin insert of vulcanizable material corresponding in size and contour to the cross-sectional size and contour of the tire, said ends and insert being all vulcanized together to form a homogeneous union of the opposed joint-forming surfaces.

In testimony whereof I have hereunto signed my name to this specification in the presence of two subscribing witnesses.

WILLIAM F. STEARNS.

Witnesses:
EDWARD S. BEACH,
GRACE L. HEASLEY.